US010705938B2

(12) United States Patent
Webster

(10) Patent No.: US 10,705,938 B2
(45) Date of Patent: Jul. 7, 2020

(54) DEVICE AND METHOD FOR CONCURRENTLY ANALYZING A PLURALITY OF TELECOMMUNICATIONS SIGNAL PROTOCOLS

(71) Applicant: David Webster, Temecula, CA (US)

(72) Inventor: David Webster, Temecula, CA (US)

(*) Notice: Subject to any disclaimer, the term of this patent is extended or adjusted under 35 U.S.C. 154(b) by 0 days.

(21) Appl. No.: 14/513,092

(22) Filed: Oct. 13, 2014

(65) Prior Publication Data

US 2017/0322858 A1    Nov. 9, 2017

Related U.S. Application Data

(60) Provisional application No. 61/890,089, filed on Oct. 11, 2013.

(51) Int. Cl.
*G06F 11/32* (2006.01)
*G06F 11/25* (2006.01)
*G06F 11/22* (2006.01)

(52) U.S. Cl.
CPC ........ *G06F 11/322* (2013.01); *G06F 11/2252* (2013.01); *G06F 11/25* (2013.01)

(58) Field of Classification Search
CPC ..... G06F 11/25; G06F 11/2252; G06F 11/322

USPC ......................................................... 375/346
See application file for complete search history.

(56) References Cited

U.S. PATENT DOCUMENTS

2008/0309349 A1* 12/2008 Sutono ............. G01R 31/31901
324/537
2009/0113303 A1*  4/2009 Goossen ................. A63F 13/10
715/719

* cited by examiner

*Primary Examiner* — Michael R Neff
(74) *Attorney, Agent, or Firm* — Donn K. Harms

(57) ABSTRACT

An improved method for telecommunication analysis and monitoring employing a logic analyzer device. The logic analyzer device provides a plurality of concurrent graphic depictions of different electronic signals under differing electronic protocols for signal error determination on a communications channel. Error source determination is enabled through the provided concurrent depiction of digital and analog signal characteristics in the differing protocols, including digital data packets, signal voltages and timing. Through this concurrent depiction the user can visually discern potential causation for electronic communication errors caused by non-continuous signal anomalies affecting one or more of the protocols.

11 Claims, 4 Drawing Sheets

DEVICE AND METHOD FOR CONCURRENTLY ANALYZING A PLURALITY OF TELECOMMUNICATIONS SIGNAL PROTOCOLS

This application claims priority to U.S. Provisional Patent Application Ser. No. 61/890,089 filed on Oct. 11, 2013, which is incorporated herein in its entirety by this reference thereto.

BACKGROUND OF THE INVENTION

1. Field of the Invention

The present invention relates generally to logic analyzing and analytic methods for troubleshooting electronic signals employed with electronic keys while employing different protocols for communications. More particularly the invention relates to a logic analyzer device providing a plurality of concurrent graphic depictions of different electronic signals under differing electronic protocols for signal error determination on a communications channel. Error source determination is enabled through the provided concurrent depiction digital and analog signal characteristics in the differing protocols, including digital data packets, signal voltages and timing. Through this concurrent depiction the user can visually discern potential causation for electronic communication errors caused by non-continuous signal anomalies affecting one or more of the protocols.

2. Prior Art

Telecommunications between computer and communications components and systems and related technologies are well known. With the advent of computer and data communications between transmitting and receiving devices, electronic signals carrying data are sent over a communications channel in a particular electronic protocol to communicate data between two or more electronic devices. Electronic signals carrying data on a communications channel have evolved from communications over short distances to distances of miles or thousands of miles. Further, such communications have gotten more sophisticated over time through the employment of differing electronic signal protocols, for instance the well known RS-232. Further, such communications have also been rendered more secure through the employment of coded signals and scrambled signals requiring an electronic key to discern.

Unfortunately, as the distance between the source of a digital message and its destination increases, and the travel over multiple networks increases, accurate transmission or reception of transmitted data at the reception point, becomes increasingly more problematic. This problem is exacerbated when different protocols are employed in a single message or when errant problems in cables and along communications channels which may affect on signal protocol, but not another.

Inaccurate or unusable data can result from numerous sources along a transmission pathway where electronic noise is communicated into a signal path, or where connections have corroded, or become loose, or a plethora of other reasons. Electronic and digital communications rely on highly accurate timing and transmission and reception standards to communicate the transmitted data in an accurate fashion to the reception point. A flawed transmission component, or reception component, or a damaged line, or low or high voltage, or spurious magnetic fields, or many other problems can cause improper signal communication along the pathway which can easily result in damaged or unusable data at a reception component. Further, such electronic communication of data employs ever changing standards frequently implemented by hardware or software or both, to communicate the electronic signals properly into the channel and to decode them at the endpoint to achieve accurate reception of transmitted data on such a communications channel.

As noted, in addition to the potential for flaws in the operation of transmission and reception components and bugs in operating software, another source of flawed digital communications results from the electrical distortion of the electronic signals transmitted which must travel through long conductors or signal pathways. The longer the pathway the signal must follow on the communications channel, the more potential exists for electronic noise to be added to the electronic signal transmitted. Thus, as a transmitted signal using one or more protocols propagates through a transmission medium or pathway, the longer it is between the transmission and reception point, the more potential exists for noise being imparted to the signal.

While inside a small facility, precautions can be taken to protect the electronic communications and data exchange between the transmission and reception components, the problems caused by electronic noise significantly increase when data is transferred between devices over a network, or plurality of engaged networks. In many cases, the resulting distortion of the received signal from a transmission point, can become so severe that information sent to a receiving point on the communications channel is lost or severely impaired.

Such a communications channel is essentially a pathway over which information or data may be communicated. The channel may travel over a physical wire that connects communicating devices, or by a wireless communication employing RF or a laser, or other radiated energy sources. The data sent through such communications channel has a source from which the information originates using one or more transmission protocols, and a destination point of delivery of the data which must discern the transmitted protocol and then employ the software or electronic components employing that protocol to obtain data from the transmitted signal. Although information or data may originate and transmit from a single source, there may be more than one destination, depending upon how many receiving stations are linked to the communications channel and how much energy the transmitted signal possesses.

In a digital communications channel, the data or information is communicated in the form of individual data bits, which may be encapsulated into multi bit message units. A byte, which consists of eight bits, is an example of a message unit that may be conveyed through a digital communications channel. A collection of bytes may itself be grouped into a frame or other higher-level message unit depending on the communications protocol of the transmission. These levels of data encapsulation facilitate the handling of communications in a complex data communications network.

Most digital messages are significantly longer than just a few bits and are broken into smaller parts and transmitted over the communication channel sequentially, and reassembled at the reception point. A plurality of different channels may provide the pathway for the message segments which are then reassembled at the reception point using the electronic signal protocol for such. Such a reassembly is frequently dependant on the communications protocol used by the transmission device which defines the order and meaning of the received bits in the transmission, so that the transmission may be reassembled at the receiving point properly. The protocol may also specify a procedure for exchanging messages, error-correction, and other information controlling the hardware which is employed for sending and receiving the electronic communications over the electronic communication pathway.

However, noise and momentary electrical disturbances such as voltage variances or frequency variances, EMF energy, and other types of electrical interference, have a high potential to cause non-continuous signal anomalies which occur in the signal transmitted across the channel from the source. Such electrical anomalies can easily cause changes in the transmitted data as it passes through a communications channel which render portions unemployable during reassembly with the appropriate protocol, or yield errors in the communication on reassembly. This of course can cause significant changes in the discerned data on the receiving end of the channel using the appropriate protocol for the transmission, thus communicating unuseable or intelligible data to the reception point. The potential for such data transmission errors also can occur where the transmission hardware using electronic components for generating the electronic signal according to the protocol used, or with the reception hardware itself. These malfunctions can be caused by malfunctioning components yielding errors in the signal varying from the transmission protocol employed. Or, the receiving electronic device can also error in discerning the incoming signal due to malfunctioning components.

For the technician attempting to ascertain the reason that the reception point suffers from lost or unusable data or impaired data communications on the communications channel, a problem arises. The technician has to discern if the errant signal reception is due to electrical disturbances caused by the pathway for the electronic signal, or is it being caused by the component transmitting or the component receiving the signal. Thus, in doing so the technician must try and discern if the lost or corrupted data is a result of hardware, software, or electronic noise or momentary electrical disturbances such as voltage spikes or frequency or timing variances, when attempting to repair or eliminate such lost or poor data reception.

The replacement of transmission and reception electronic hardware is frequently not possible at the transmission point if it happens to be remote, and is an expensive and time consuming option at either the transmission point or reception point. Reloading of software or firmware can also be prone with its own set of potential problems. Consequently, it is imperative that the technician be able to ascertain whether the electronic signal causing the lost or unusable data received at a reception point, is actually caused by transmission or reception hardware or component firmware, or software, and not the communications line or channel, before initiating a repair to those components or systems.

However, with the current state of the art, the technician has no reliable means to determine whether the communications problems in an electronic signal carry a data transmission are caused by noise and voltage variances on the communications channel or the transmission and reception equipment or software. As such, repairs may be initiated which are expensive and time consuming and which do not remedy the problem. Further, more than one person may be required, and/or multiple pieces of electronic test equipment may be required.

Signal communication errors which occur between two machines, for example ECUs, SKL's, and other telecommunication devices, when data which is sent or received is not within the specification of the communication protocol, result in a failure to successfully communicate. Some know protocols in telecommunications include ds-101, rs-232, rs-485, and ds-102, and others. These protocols are employed to define the electrical characteristics and timing of transmitted electronic signals, and upon reception, the meaning of signals. If the voltage, or signal frequency timing of the signal being transmitted is out of a specified range, the receiving machine will not be able to successfully identify the content of the signals, and communication between the two machines cannot be achieved.

Data encryption is also well known in the art of electronic transmission to maintain data proceeding to, and arriving at receiving end as confidential. Encrypted data employs any number of transmission and reception protocols and additionally is communicated using cryptographic keys which encode the signal. In this fashion, the actual content of the communication cannot be ascertained until the receiving end component, employs the correct protocol and the communicated key whereafter the signal is decoded to yield intelligible data. Simple key loaders (SKL) are a type of fill device which load such cryptographic keys to communication signals carried on the channel. Thus SKL's employed at the sending and receiving end of a telecommunication channel provide the first line of communication.

Since the communicated data is encrypted, it is required for the receiving component to employ the correct electronic signal protocol and to decode the communicated signal in order to ascertain the communicated data. For this to occur, it requires the receiving component to first properly receive the key which is transmitted for carrying out the proper signal decoding. Subsequently, the receiving component is enabled to employ the key to ascertain the data content of the communicated signal on the channel.

As noted previously, errors in electronic signal communications over a pathway, including voltage and signal timing and current frequency and other issues, can frequently result in this key and other signal data improperly reaching the end machine which upon employing the correct protocol and the key in decoding and deciphering the communication to yield the correct data. However, in order to ascertain wherein signal anomalies exist, or whether it is a transmission or receiving component mal functioning, electronic signal troubleshooting and analyzing is required employing the key.

Encrypted data is always private and in the case of governments, often includes content which may be highly classified. As such, when analyzing and monitoring communications between two machines employing encrypted data, users are typically unable to access the content of the data for the purpose of analyzing such signals without the proper key which the technician may not have or be security-cleared to employ. Conventional EKMS analytic methods therefor typically employ active monitoring and decoding processes which often require time consuming testing procedures. This can include the employment oscilloscopes for ascertaining signal voltage and signal timing of transmissions over the communication channel, as well logic analyzers for monitoring the discerned digital data. However, such voltage and timing variances may not cause any problems with digital communications which are highly error resistant, and as a consequence observation of an oscilloscope screen yields little discernible information without concurrently viewing or monitoring of the received discernable data since the errors may be fixed by retransmission of the packets if errors of such are realized by the modems or communicating devices using the appropriate protocols.

However, a shortcoming of current methods and devices is the provision of a unified visually discernible method and device for concurrently in real time, viewing various aspects of the communicated signal. In order to ascertain whether line conditions or transmission or receiving components are the source of a communication problem a user must analyze signal data, both digital data and analog signals, concurrently in real time, as a basis for telecommunication analytics. As such, and as noted, conventional analyzing and testing procedures often result in the technician being unable to locate the source or reason for communication errors, and a mis-communication between the machines continues because of the lack of depictions relating to the multiple aspects of electronic signals.

As a result, there is a continuing unmet need for an improved device and method for monitoring, reviewing and analyzing digital communications over an electronic pathway or channel, which allows the user to concurrently capture and depict representations of electronic signal data, byte for byte, yielding a visual feedback to discern real time, concurrent, signal voltage and timing values, in a visual display. Such a device needs to operate in a manner to also concurrently depict concurrent digital data being sent and received or perceived as sent, such that a cause for mis communication occurring in non-continuous signal anomalies can be ascertained. Such a device should allow users to reference specifications of known telecommunication protocols, such as DS-101, DS-102, RS-232, RS-485, and others, in order to discern such anomalies by comparison.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a improved analytic device and method employing a viewable screen for monitoring and analyzing communications between telecommunications devices in multiple concurrent visual depictions of multiple aspects of the communication. The device and method herein provides such concurrent visually discernable depictions of portions involved in an individual electronic communication over a pathway, to allow for a discerning by the user of electronic carrier signal voltages, signal timing, and raw communicated digital data. A concurrent side-by-side depiction viewable by the users, provides the user a means to visually discern non-continuous signal anomalies, from the concurrent multiple display, based on known specification of conventional protocols. Such protocols may include, but are not limited to, DS-101, DS-102, RS-232, RS-485 protocols. It is of particular advantage of the present method and apparatus, that the user need not ascertain the actual digital data content, and thereby can perform necessary analytics to correct system problems, even with encrypted telecommunications.

In accordance with a first preferred mode of the invention, the device and method herein allows a user to capture byte for byte, signal data carried electronically over the communication pathway connected between two electronic telecommunication devices, such as SKL, ECU, and others. Concurrently the user is enabled with the ability to discern and store for later assessment if necessary, a real time concurrent depiction of the original and real-time voltage of the signal, and the oscillation or timing of the signal being sent to carry the discerned signal data, for recording and playback of the signal.

During an electronic signal record capturing procedure, digital characteristics from the electronic signal, are visually displayed, concurrently adjacent a depiction of a record of the signal voltage, alongside a depiction of signal timing characteristics of the carrier signal for the digital communication. With this side by side concurrent depiction of signal and data and other noted characteristics, the user is able to visually discern, fleeting or non-continuous electronic signal anomalies which occur which may be the cause of anomalies within in the discerned digital data of the electronic communication. Such is accomplished by a visual depiction for comparison, of any anomalies in the analog characteristics of the electronic carrier signal, in comparison with known or required signal protocol specifications.

In at least one preferred mode, the user may be provided with a lookup table of known protocol specifications. Thus the user is provided with a means for comparison between captured signal characteristics and data and the intended signal characteristics and data. The captured signal characteristics, including voltage and the timing of the signal carrying the data being sent, can then be compared to known parameters of the given protocol, in order to ascertain non-continuous anomalies with the captured signals.

In at least one preferred mode, the device and method herein is additionally configured to perform profiling analytics to communication channels between telecommunication devices. The device herein can in a first step be employed to profile one or more known working communication channels between given electronic machines, and to record the visually depicted profile which may be employed subsequently for performing analytic testing on non-working communication channels or pathways between similar machines. The side by side depictions of known good and the bad signal over a time duration will allow the user to determine the problem.

In at least one preferred mode the device is configured to record, playback, and play in a video display, the electronic signal characteristics on a users computer.

In at least one preferred mode, the analytic device allows a user to easily connect to computer, laptop, or other electronic device, to execute the onboard software adapted to the task of receiving the input signals and providing such concurrent visual display, recording, and playback of the telecommunication signals.

It is briefly noted that upon a reading this disclosure, those skilled in the art will recognize various means for carrying out these intended features of the invention. As such, it is to be understood that other methods, applications and systems employing software adapted to the task may be configured to carry out these features and are therefor considered to be within the scope and intent of the present invention, and are anticipated.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

Figure 1:
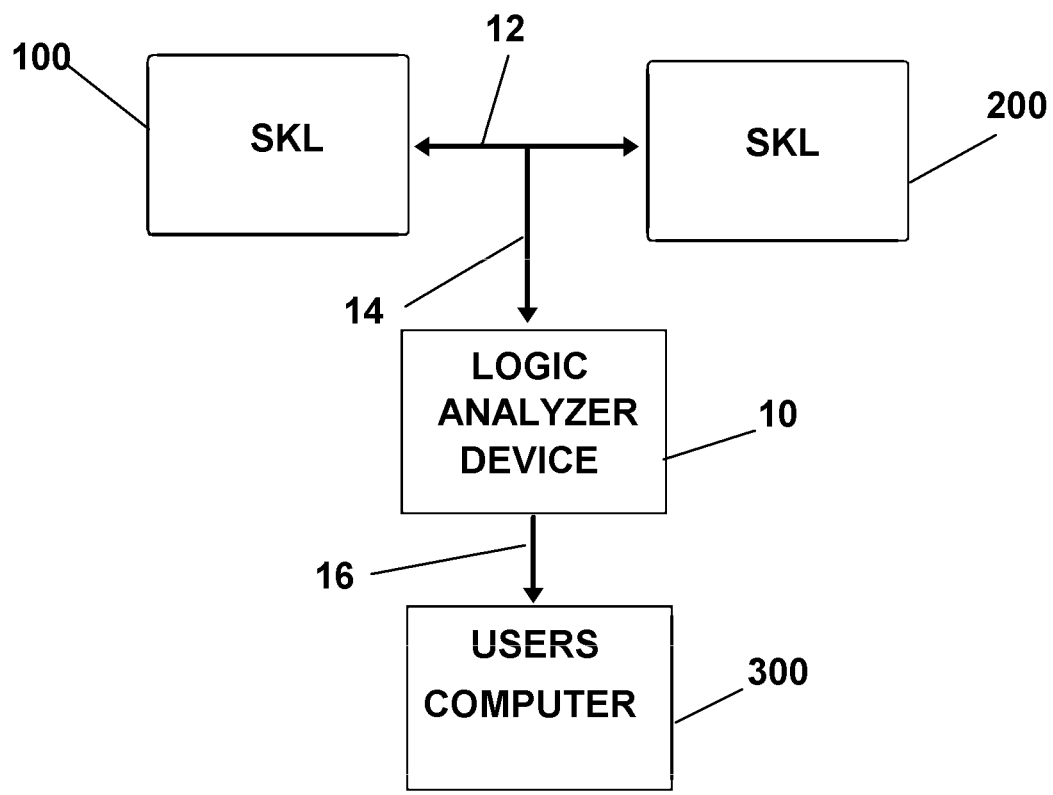
FIG. 1 shows a preferred flow diagram representation of a preferred as used-mode of the invention.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-7, wherein similar components are identified by like reference numerals, there is seen in FIG. 1 a diagram flow representation of a preferred as-used mode of the invention providing an analytic device 10 and method which employs an interface device having a video display thereon, in-between two known electronically communicating devices. So engaged to an as-used position the device is employed to depict a graphic display screen showing a known two-way communication between two electronic components, in delineated increments of time which is representative of both the digital and the analog electronic signals, which occur in time segments depicted on the display. So depicted, in all modes of the device and method herein, to user is provided with time-segmented graphic depictions of each communication between both device showing both digital coded segments in time-representative columns with the actual analog signal carrying the digital segments.

FIG. 1 also shows the method for depicting and monitoring and analyzing signals for electronic communications 12 between telecommunications devices, such as key loaders 100, 200. In accordance with a first preferred mode of the invention, an analytic device 10 is provided which is capable of communication 14 with a communication pathway shown as channel 12 between telecommunication devices, such a key loaders 100, 200, ECU's, or other conventional machines. The communication 14 of the device 10 the communication channel 12 can be accomplished by known bus connectors, allowing the user to connect directly to the cable or pathway carrying the channel 12, which may be a communication cable, or the like, without disturbing the communicated signal. This maintains the original and real-time voltages and timing of the electronic signal being communicated. However other modes are envisioned wherein the device 10 can capture the communicated electronic signals along a pathway wirelessly from the communication channel 12.

The device 10 is preferably adapted with appropriate electronic connections and wiring, such as USB connections, to allow a user to easily connect 16 to a computer 300, laptop, or other electronic device engaged with a video screen, for executing software adapted to the task of producing and providing concurrent depictions in a visual display of the different protocols and electronic measurement of the signal captured. Electronic memory would be engaged with the computer or device to allow for recording, and playback of the telecommunication signals being reviewed so that they may be reviewed subsequently.

The connections 16 can employ any known electronic connector, such as USB connectors, RS-232 serial connectors, pin connectors, or other conventional wire connectors to thereby allowing a plug-and-play type communication with the an engageable computer 300, and similar connectors may be employed to connect the device 10 to the electronic pathway being tested.

Figure 2:
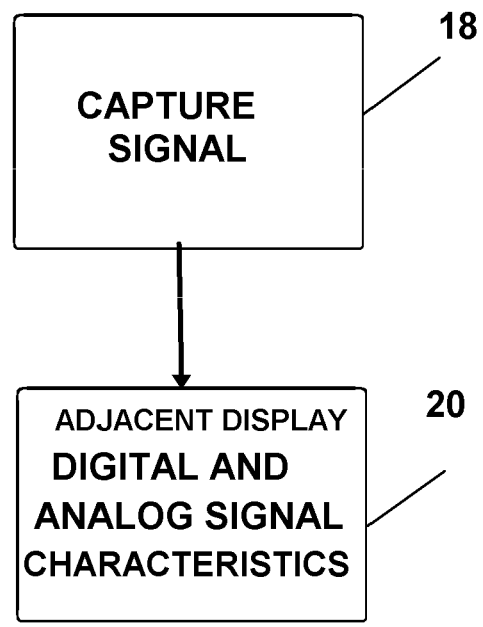
FIG. 2 shows a flow diagram representation showing a preferred flowpath of the operations of the invention.

In accordance with one preferred mode of the invention, shown in FIG. 2, the device and method herein allows a user to capture 18 byte for byte the electronic signal data from the pathway providing the communication channel 12 between two telecommunication machines, such as SKL 100, 200. The connections are configured to maintain the original and real-time voltage of the captured electronic signal, and the timing of the electronic signal being reviewed, and for communicating the electronic signal to electronic memory for recording and subsequent playback 20 of the captured electronic signal.

Figure 4:
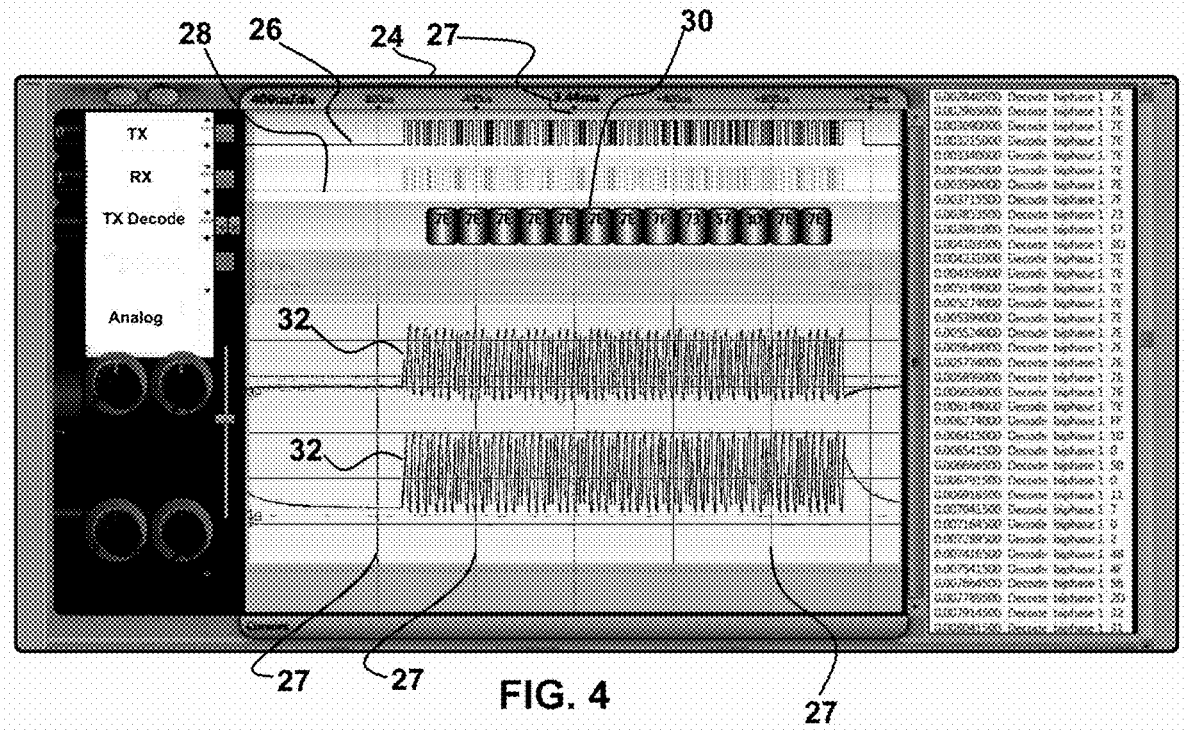
FIG. 4 shows an example display of a concurrent visual depiction columnized time segments showing concurrent digital data packet signals and analog carrier characteristics displayed to the user in columnized time-segments for determining either signal anomalies, or timing or packet anomalies in an RS-485 protocol communication.

FIG. 4 show an example a video display 24 inoperative engagement with the computer, and showing adjacent signal characteristics discerned, in time segments in an RS-485 protocol electronic communication. Shown are the depictions of the time segments and segments of the captured electronic signal and a concurrent visual depiction of digital 26, 28 and analog signal 32 characteristics displayed adjacent each other and in respective time segments 27. In this fashion, the user can view the aspects of the electronic signal and look for signal anomalies in one or more of the depicted signal qualities running and depicted adjacent in respective time segments 27.

During the electronic signal recording capturing procedure, or playback thereof, the electronic pathway is connected to the device 10 using wires and connectors such as USB connectors. A harness may be employed of for instance USB connectors to input the captured electronic signal into different electronic components of the device 10 to produce individual line depictions on the video screen being measured.

Figure 7:
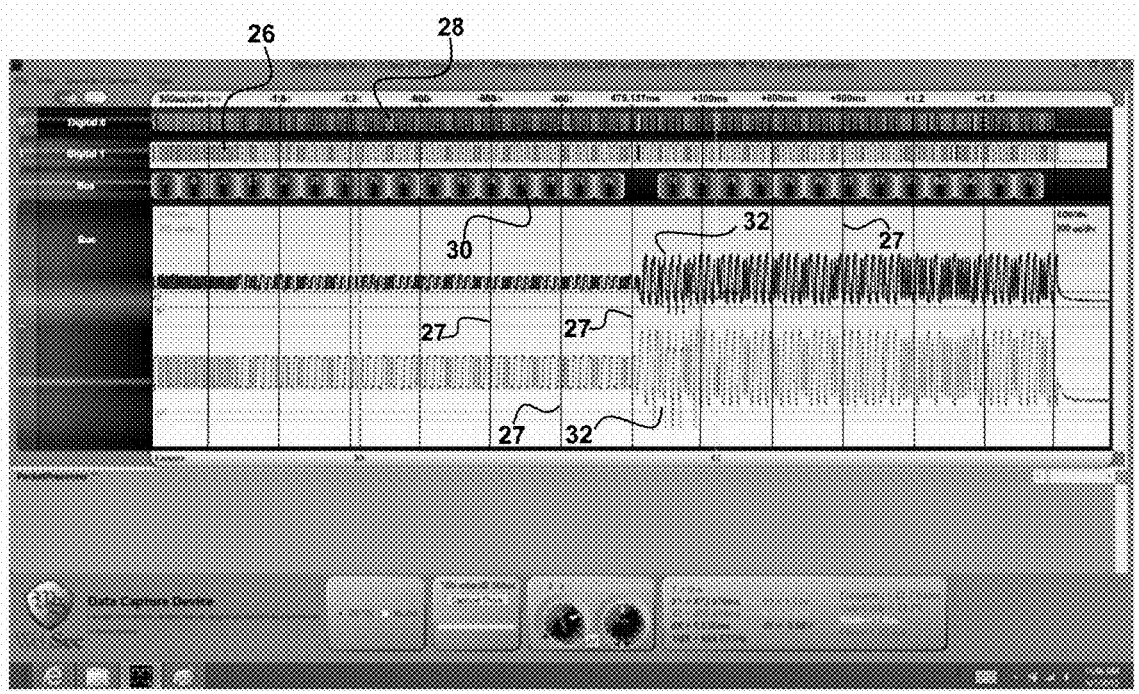
FIG. 7 shows another display of a concurrent visual depiction of segments of digital and analog signal characteristics of communications between two electronic components with signals aligned and displayed to the user in time segments for determining signal anomalies.

Along with the plurality of synchronized lines depicting electronic signal characteristics being measured, digital data packets 30 may also be visually displayed, in time segments 27 concurrently alongside voltage and timing characteristics of the electronic signal. Thus when an error appears in the digital data packets 30 in a time segment 27, the user by reviewing the line depictions in that same time segment 27, is able to visually discern a non-continuous anomaly of a quality of aspect of any one or more electronic signal represented by repetitive lines. For instance as depicted in FIG. 7, an error in the flow of the communicated and depicted digital data packets 30 in a time segment 27, is determined, and the cause may be determined by a visual comparison to the known line characteristics in the same time segment 27. As can be seen the line segments depicting segments of the analog 32 electronic signal characteristics in the same time segment 27, has inconsistencies with known protocol specifications.

For example, in a RS-485 protocol communication, it may be known under a normal protocol that a certain digital data packet 30 should be sent at a known voltage and signal timing. The device 10 and method herein advantageously present to the user in a concurrent depiction of adjacent graphic depictions, the digital and analog characteristics of the electronic signal, adjacent the message output, such that the user can confirm whether or not the intended analog signal characteristics are being sent with the given digital data packet, and ascertain the source of the problem being line related, or component related.

Figure 3:
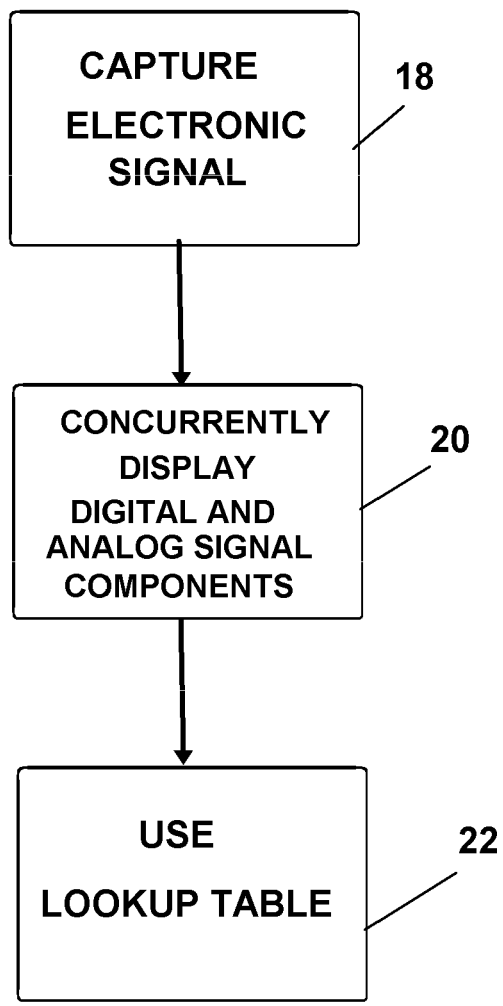
FIG. 3 shows a diagram representation showing another preferred flowpath of the operations of the invention.

In at least another preferred mode, shown in FIG. 3, the user may be provided with the step of using a lookup table 22 of known protocol specifications for timing voltage etc. Thus the user is provided with a means for comparison between captured depictions and the values thereof of the electronic signal the intended signal characteristics. The intended signal characteristics, including voltage and timing of data being sent, can then be compared to known parameters of the given protocol, in order to ascertain non-continuous anomalies with the captured signals. Particularly preferred is the depiction of line segments adjacent each other within time segments 27 denoted by lines.

Figure 5:
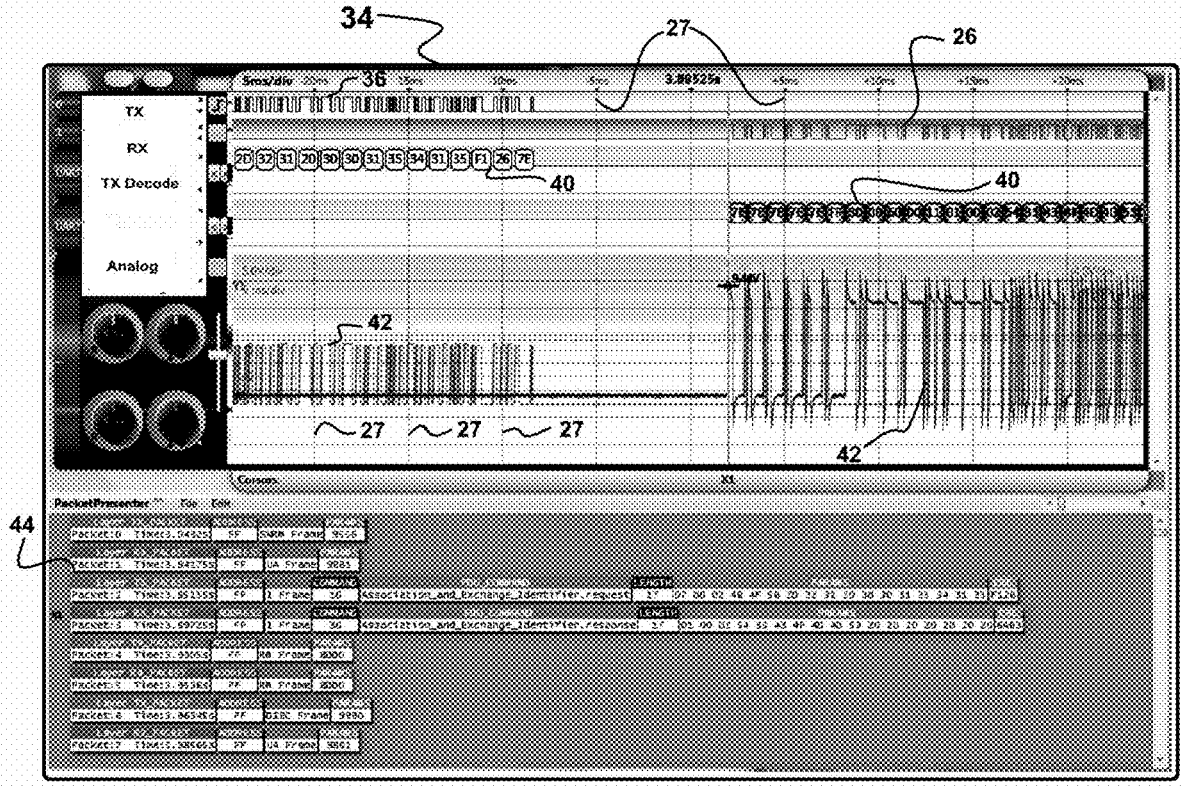
FIG. 5 shows an example display of another concurrent visual depiction of segments digital and analog signal characteristics displayed concurrently in time segments to the user for determining signal anomalies, for an RS-232 protocol communication.
Figure 6:
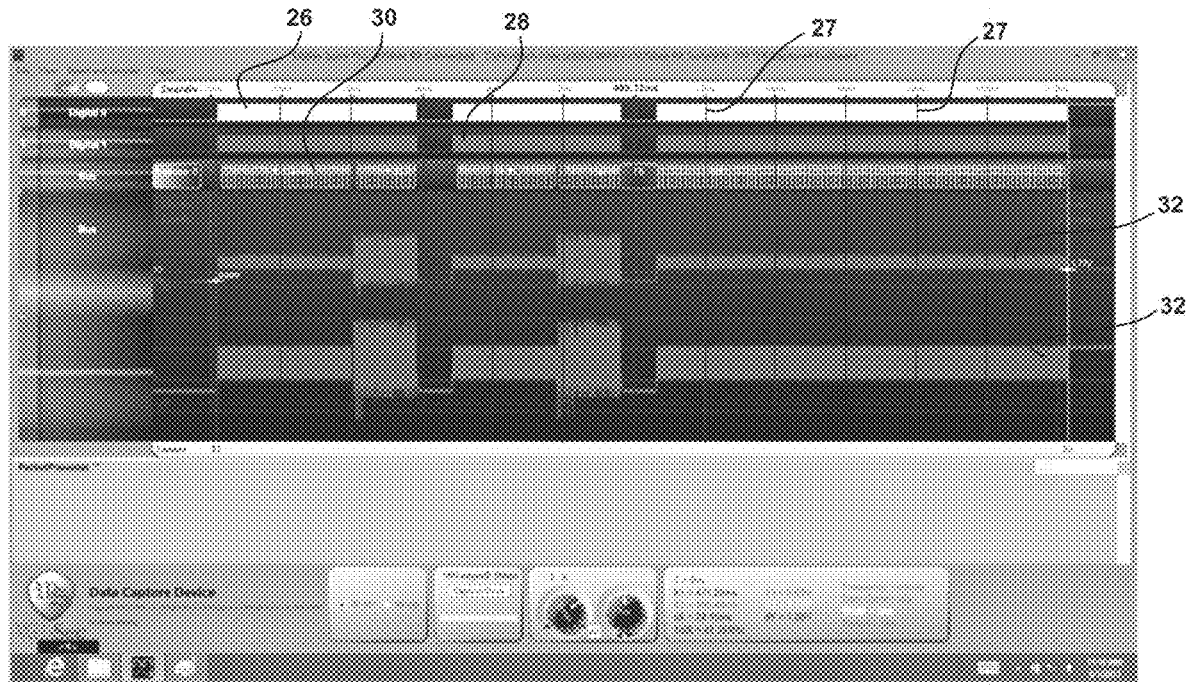
FIG. 6 shows another display of a concurrent visual depiction similar to FIG. 4 showing digital and analog signal characteristics displayed to the user in time segments for determining signal anomalies.

FIG. 5 show another example display 34 of an RS-232 protocol communication, showing the concurrent visual depiction of transmission (TX) digital 36, and the responding reception (RX) digital 38, and the aligned analog signal 42 characteristics displayed in time segments 27 to the user for determining signal anomalies. Again, digital data packets 40 are visually displayed within a visually delineated time segment 27 on the communicated video depiction, concurrently alongside depictions in the analog signal 42 of the electronic signal voltage and timing characteristics in columized time segments 27. Additionally depicted, is a text readout 44 of the captured 18 signal data adjacent the line segments is the time segments 27 which are relative to the text readout 44 in each respective time segment 27.

In at least one preferred mode, the device and method herein is additionally configured to perform profiling analytics to communication channels between telecommunication devices. The device can be employed to profile known working communication channels between given device, and record this profile for performing analytic testing on non-working communication channels between similar devices.

The device and method herein provides concurrent visual depictions of communication signal voltages, timing, and raw digital data, allowing the user to visually discern non-continuous signal anomalies in the concurrent display, based on known specification of conventional protocols, including but not limited to, DS-101, DS-102, RS-232, RS-485 protocols. It is of particular advantage of the present invention that the user does not need to ascertain digital data content, and can perform necessary analytics even with encrypted telecommunications.

This invention has other applications, potentially, and one skilled in the art could discover these. The explication of the features of this invention does not limit the claims of this application; other applications developed by those skilled in the art will be included in this invention.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. An improved method for telecommunication analysis and monitoring employing a logic analyzer device, comprising the steps of:
    operatively engaging said logic analyzer device to an electronic pathway communicating between a first telecommunication machine and a second telecommunication machine;
    capturing an electronic signal being sent through said electronic pathway from said first telecommunication machine and storing said electronic signal in electronic memory, wherein original and real-time voltages, and timing of said electronic signal, are maintained therein;
    discerning individual characteristic signals of a plurality of electronic characteristics from said electronic signal;
    employing a video screen to display a synchronized concurrent depiction of each respective said characteristic signal, adjacent the other said characteristic signals, whereby a user can discern at a position in said synchronized concurrent depiction, an error in a respective one of said electronic characteristics of said electronic signal from viewing said synchronized depiction.

2. The method of claim 1, further comprising displaying digital characteristics from said electronic signal, adjacent a depiction of a record of the signal voltage, alongside a depiction of signal timing characteristics.

3. The method of claim 1, further comprising providing a lookup table of known protocol specifications.

4. The method of claim 3, further comprising comparing said individual characteristic signals to parameters of said known protocol specifications.

5. The method of claim 1, wherein operatively engaging said logic analyzer device to said electronic pathway employs an electronic connector.

6. The method of claim 5, wherein said electronic connector includes a USB connector, RS-232 serial connector, harness or pin connector.

7. An improved method for telecommunication analysis and monitoring employing a logic analyzer device, comprising the steps of:
    operatively engaging said logic analyzer device to an electronic pathway communicating between a first telecommunication machine and a second telecommunication machine;
    capturing an electronic signal being sent through said electronic pathway from said first telecommunication machine and storing said electronic signal in electronic memory, wherein original and real-time voltages, and timing of said electronic signal, are maintained therein;
    discerning individual characteristic signals of a plurality of electronic characteristics from said electronic signal;
    employing a video screen to display said individual characteristic signals, digital data packets in time segments concurrently alongside voltage and timing characteristics of said electronic signal, whereby a user can discern at a position in said synchronized concurrent depiction, an error in a respective one of said electronic characteristics of said electronic signal from viewing said synchronized depiction.

8. The method of claim 7, further comprising providing a lookup table of known protocol specifications.

9. The method of claim 8, further comprising comparing said individual characteristic signals to parameters of said known protocol specifications.

10. The method of claim 7, wherein operatively engaging said logic analyzer device to said electronic pathway employs an electronic connector.

11. The method of claim 10, wherein said electronic connector includes a USB connector, RS-232 serial connector, harness or pin connector.

* * * * *